US009290195B2

(12) United States Patent  
Olivier

(10) Patent No.: US 9,290,195 B2
(45) Date of Patent: Mar. 22, 2016

(54) STORAGE BAG FOR ATTACHMENT TO UTILITY CARTS

(71) Applicant: Jay Charles Olivier, Austin, TX (US)

(72) Inventor: Jay Charles Olivier, Austin, TX (US)

(73) Assignee: Jay C. Olivier, Austin, TX (US)

( * ) Notice: Subject to any disclaimer, the term of this patent is extended or adjusted under 35 U.S.C. 154(b) by 138 days.

(21) Appl. No.: 14/328,637

(22) Filed: Jul. 10, 2014

(65) Prior Publication Data

US 2016/0009307 A1  Jan. 14, 2016

(51) Int. Cl.
B62B 5/00 (2006.01)
B62B 3/10 (2006.01)

(52) U.S. Cl.
CPC .. B62B 3/102 (2013.01); B62B 5/00 (2013.01)

(58) Field of Classification Search
CPC .... B62B 2202/22; B62B 5/0023; B62B 5/00; B62B 9/26
USPC ................ 224/401, 407, 409, 584; 383/121.1
See application file for complete search history.

(56) References Cited

U.S. PATENT DOCUMENTS

| | | | | |
|---|---|---|---|---|
| 2,865,647 A * | 12/1958 | Wilson | A47B 31/00 | 248/98 |
| 3,894,748 A * | 7/1975 | Ratcliff | B62B 3/10 | 280/47.35 |
| 4,165,088 A * | 8/1979 | Nelson | B62B 3/02 | 280/47.35 |
| 4,491,257 A * | 1/1985 | Ingles | A61H 3/00 | 135/66 |
| 4,593,841 A * | 6/1986 | Lange | A45C 9/00 | 224/153 |
| 4,887,837 A * | 12/1989 | Bonewicz, Jr. | B62B 1/12 | 108/129 |
| 5,788,032 A * | 8/1998 | Krulik | A45C 3/02 | 150/107 |
| 5,894,977 A * | 4/1999 | Krueger | A45F 3/04 | 224/153 |
| 7,036,699 B1 * | 5/2006 | Hay | A61G 5/10 | 224/407 |
| 7,334,712 B2 * | 2/2008 | Hassett | A44B 19/262 | 224/268 |
| 8,245,872 B2 * | 8/2012 | Hanot | B65D 3/10 | 215/370 |
| 8,317,219 B2 * | 11/2012 | Bruce | B62B 5/0013 | 280/47.26 |
| 8,479,961 B2 * | 7/2013 | Schneidau | B60R 11/02 | 224/409 |
| 8,646,805 B2 * | 2/2014 | Goldszer | B62B 1/008 | 280/30 |
| 9,089,197 B2 * | 7/2015 | Sugano | A45F 4/02 | |
| 9,233,700 B1 * | 1/2016 | Elden | B62B 1/12 | |
| 2004/0188572 A1 * | 9/2004 | Sibley | B62B 3/106 | 248/98 |
| 2015/0091265 A1 * | 4/2015 | Bentson | B62B 1/26 | 280/47.19 |

FOREIGN PATENT DOCUMENTS

| | | | | | |
|---|---|---|---|---|---|
| FR | 2859358 A1 | * | 3/2005 | ............. | A45C 5/143 |
| FR | 2958511 A1 | * | 10/2011 | ............. | A45C 7/0077 |
| GB | 2235907 B | * | 1/1994 | ............. | B62B 1/12 |
| JP | 3173347 U | * | 2/2012 | ............. | B62B 5/0023 |

* cited by examiner

*Primary Examiner* — Justin Larson
(74) *Attorney, Agent, or Firm* — Plager Schack LLP

(57) ABSTRACT

Some embodiments of the present disclosure include a storage bag for holding equipment that is not easily stored on a utility cart. The storage bag may include a storage compartment having an opening, the storage compartment configured to accept equipment, a handle sleeve attached to an outer surface of the bag, the handle sleeve configured to engage with a handle on a utility cart, and a barrier positioned on a bottom surface of the storage compartment. The storage bag may additionally include a closing mechanism to secure the equipment in the bag. In embodiments, the storage bag has dimensions configured not to interfere with the functionality of the utility cart.

9 Claims, 4 Drawing Sheets

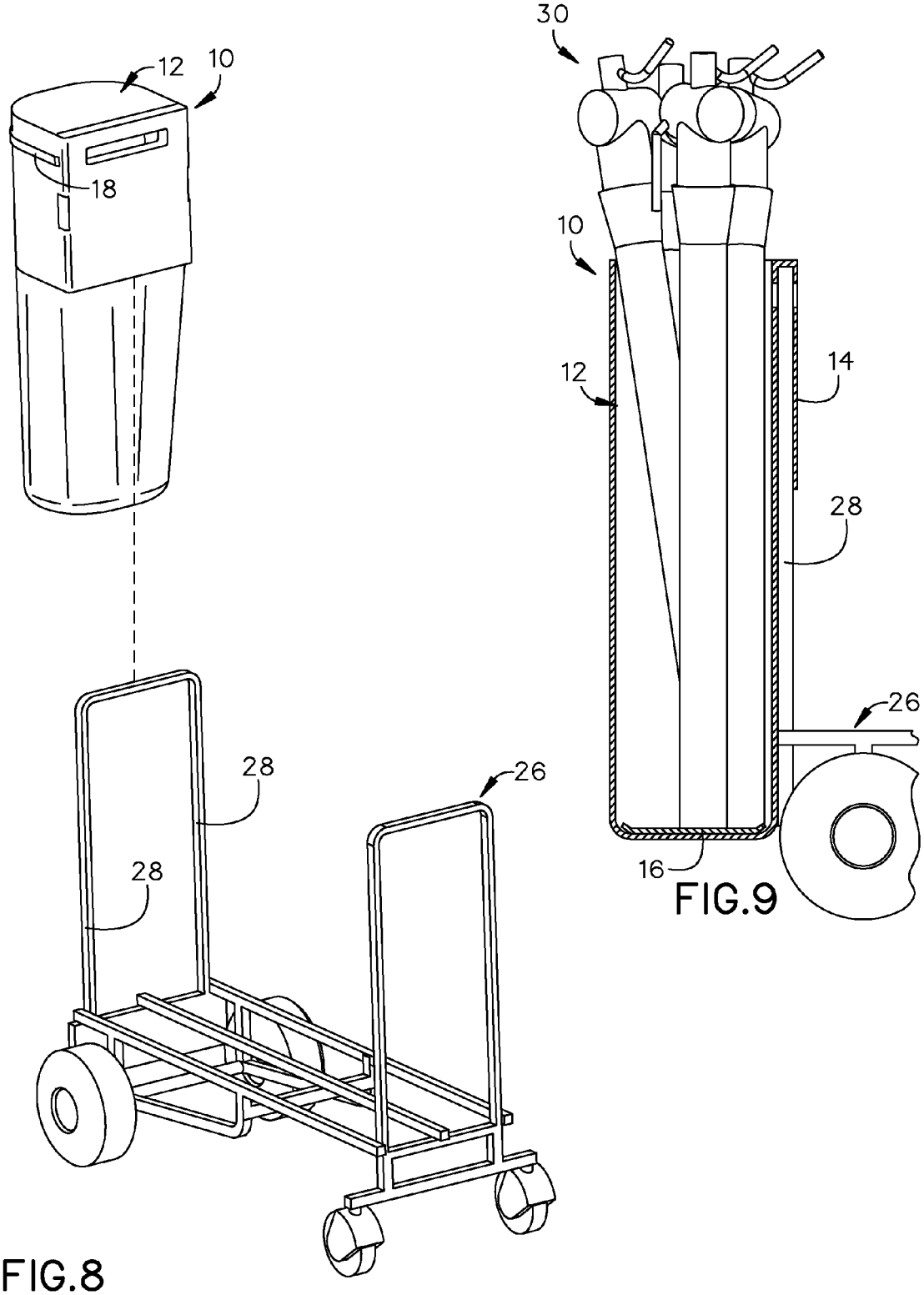

STORAGE BAG FOR ATTACHMENT TO UTILITY CARTS

BACKGROUND

The embodiments herein relate generally to storage and transportation accessories, and more particularly, to a storage bag for attachment to a utility cart, wherein the storage bag is configured to hold items that do not fit on conventional utility carts.

Utility carts are not desired to carry long, hard objects, such as tripods, C-stands, light stands, speaker stands, pipes, carpet rolls, display screens, and the like. Specifically, there is not a stable surface for the long, hard items to rest on a multi cart loaded with other items, such as hard cases or soft bags. Storing these types of items on top of other items on a utility cart results in the items falling off when turning corners or hitting bumps, even when the items are secured with bungee cords or other ties. The items also sometimes exceed the length of the cart, making it more difficult to get into elevators and turn tight corners in a building.

Therefore, what is needed is a storage bag configured to attach to a utility cart and carry items that cannot be carried sufficiently on conventional utility carts.

SUMMARY

Some embodiments of the present disclosure include a storage bag for holding equipment that is not easily stored on a utility cart. The storage bag may include a storage compartment having an opening, the storage compartment configured to accept equipment, a handle sleeve attached to an outer surface of the bag, the handle sleeve configured to engage with a handle on a utility cart, and a barrier positioned on a bottom surface of the storage compartment. The storage bag may additionally include a closing mechanism to secure the equipment in the bag. In embodiments, the storage bag has dimensions configured not to interfere with the functionality of the utility cart.

BRIEF DESCRIPTION OF THE FIGURES

The detailed description of some embodiments of the invention is made below with reference to the accompanying figures, wherein like numerals represent corresponding parts of the figures.

FIG. 8 is an exploded view of one embodiment of the present invention.

FIG. 9 is a section detail view of one embodiment of the present invention, taken along line 9-9 in FIG. 2.

DETAILED DESCRIPTION OF CERTAIN EMBODIMENTS

Figure 1:
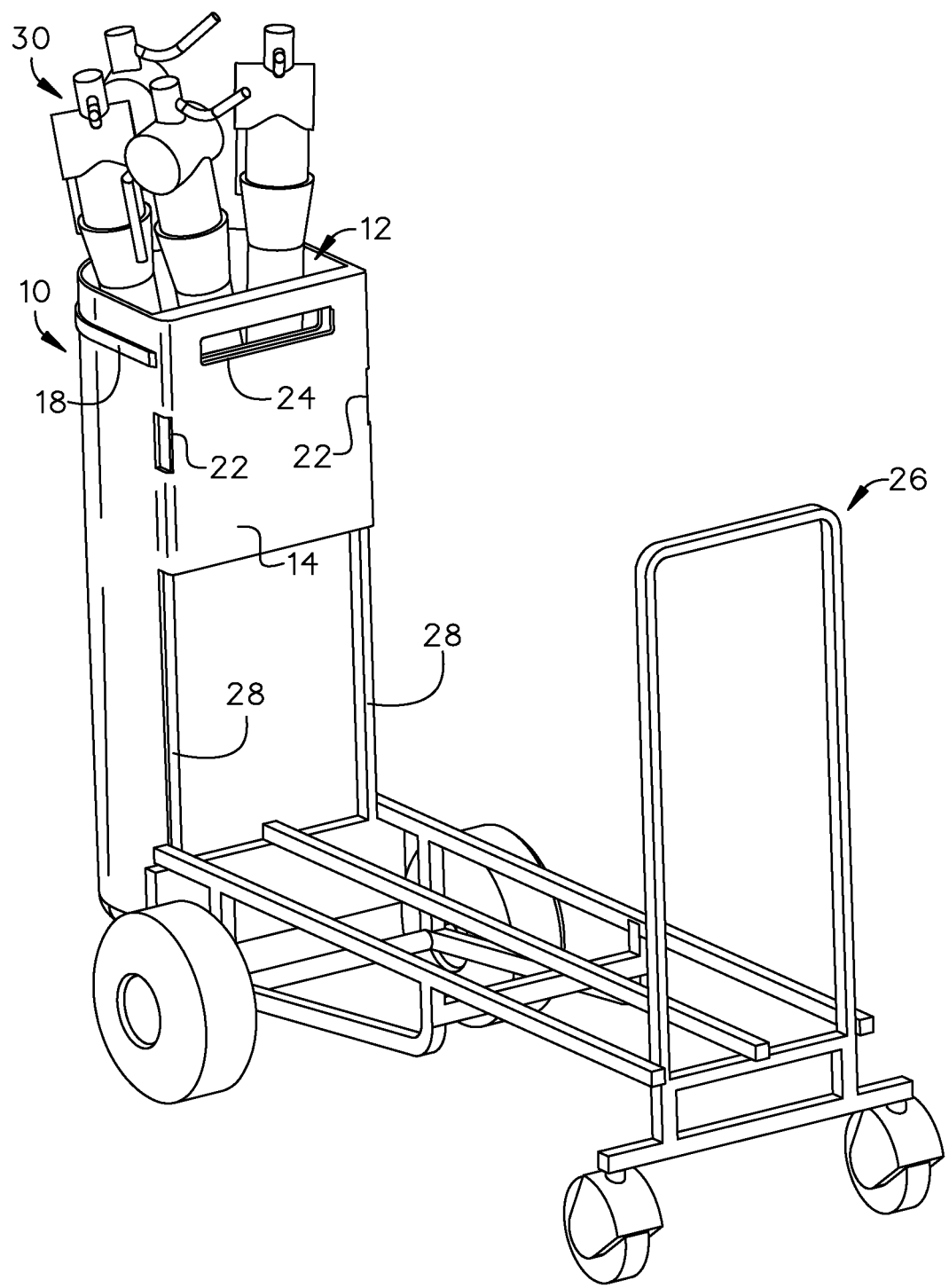
FIG. 1 is a front perspective view of one embodiment of the present invention shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to store items on a utility cart that cannot conventionally fit well on a utility cart and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Bag
2. Storage Compartment
3. Handle Sleeve

The various elements of the storage bag for attachment to a utility cart and for storing items that cannot traditionally be stored sufficiently on a utility cart of the present disclosure may be related in the following exemplary fashion. It is not intended to limit the scope or nature of the relationships between the various elements and the following examples are presented as illustrative examples only.

By way of example, and referring to FIGS. 1-9, some embodiments of the storage bag 10 of the present disclosure comprise a storage compartment 12 having an opening through which equipment 30 can be inserted into the storage compartment 12, a handle sleeve 14 attached to an outer surface of the storage compartment 12, the handle sleeve being configured to removably engage with the handle 28 of a cart 26, such that the storage bag 10 hangs on the handle 28 of the cart 26, as shown in FIGS. 1, 2, 8, and 9.

Figure 2:
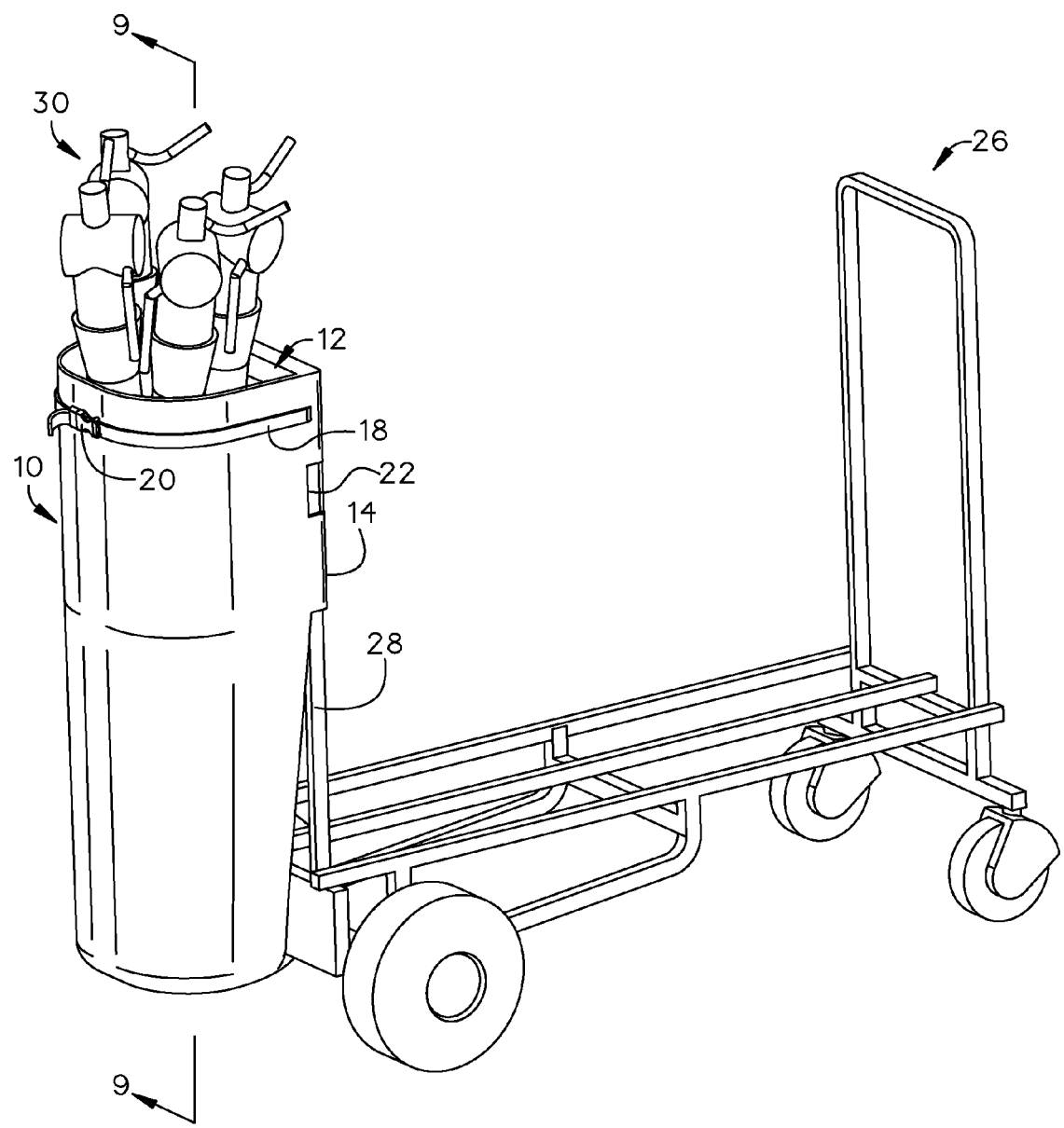
FIG. 2 is a rear perspective view of one embodiment of the present invention shown in use.
Figure 3:
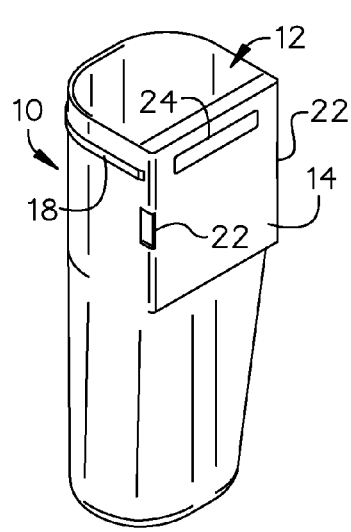
FIG. 3 is a front perspective view of one embodiment of the present invention.
Figure 4:
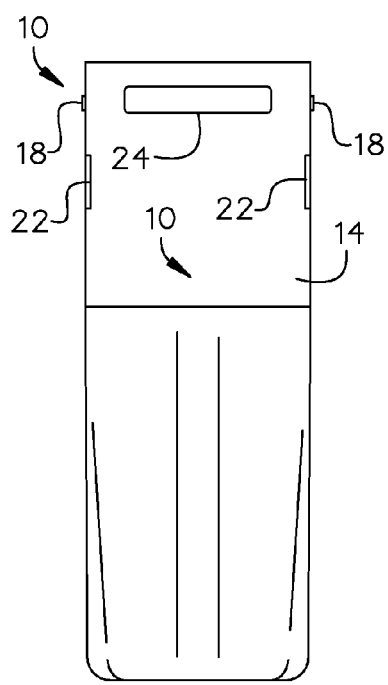
FIG. 4 is a front view of one embodiment of the present invention.
Figure 5:
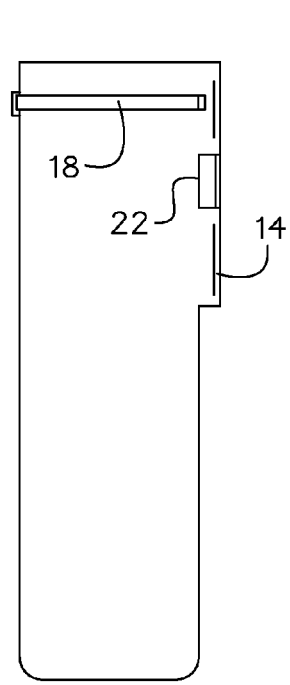
FIG. 5 is a side view of one embodiment of the present invention.
Figure 6:
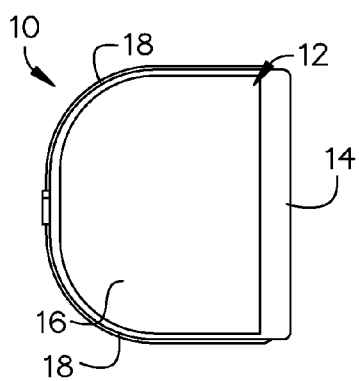
FIG. 6 is a top view of one embodiment of the present invention.
Figure 7:
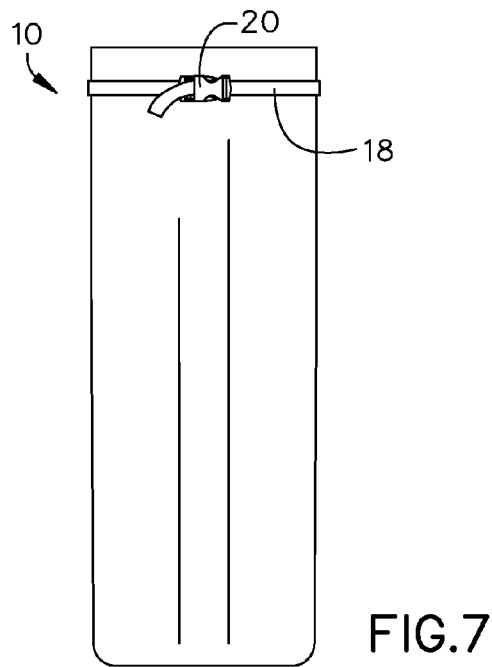
FIG. 7 is a rear view of one embodiment of the present invention.

In some embodiments, the storage bag 10 may further comprise a barrier 16, such as a hard plastic bottom, on the bottom of the storage bag 10. The barrier 16 may be simply placed in the bottom of the storage compartment 14. Alternatively, the barrier 16 may be physically attached to the bottom of the storage compartment 14. For example, the barrier may be attached using any conventional fastener, such as an adhesive or a plurality of rivets, such as about three aluminum rivets. Additionally, the storage bag 10 may comprise a closing mechanism, such as a strap 18 with a fastener, such as a cinch buckle 20, positioned proximate to the opening in the storage compartment 12, as shown in FIGS. 2 and 7. The strap 18 may be used to tighten the portion of the storage bag 10 proximate to the opening into the storage compartment 12 around the equipment 30, securing the equipment 30 within the bag 10. The bag 10 may also include a plurality of side cutouts 22, wherein the side cutouts 22 are configured to engage with a shelf or other attachment. For example, the side cutouts 22 may be rectangular and may allow a user to set up a shelf within the storage compartment 12.

In embodiments, the handle sleeve 14 of the storage bag 10 may comprise a handle cutout 24 proximate to the opening into the storage compartment 12, allowing a user to grasp the handle 28 of the cart 26.

The bag 10, including the handle sleeve 14, may be made of any suitable material and, in some embodiments, comprises a nylon material, such as urethane coated 1000 denier ballistic nylon. Similarly, the strap 18 may comprise any suitable strap and, in some embodiments, comprises a nylon strap. Likewise, the fastener may be any fastener suitable for tightening the strap 18 around the bag 10 and, in some embodiments, may comprise a cinch buckle. Alternatively, the closing mechanism may comprise any other suitable closing mechanism for tightening the opening of the storage compartment 12 around the equipment 30. The barrier 16 may comprise any material suitable for creating a puncture-proof or puncture-resistant surface in the bottom of the bag 10 and, in some embodiments, may comprise a hard plastic material, such as polystyrene plastic with a lip, such as a one inch lip around the outer edge thereof.

The storage bag 10 of the present disclosure may have any size necessary to engage with the desired utility cart. In some embodiments, the storage bag 10 may have a height and width that is substantially similar to the height and width of the handle 28 of a cart 26, such that the storage bag 10, when engaged with the handle 28, does not drag along the ground or interfere with the wheels on the cart 26. In embodiments, the barrier 16 may be slightly smaller than the inner diameter of the bottom of the storage compartment 12, such that the barrier 16 is able to fit therein. For example, in some embodiments, the barrier 16 may be a 12 inch diameter polystyrene plastic disk with a one inch lip around the outer circumference thereof.

To use the storage bag 10 of the present disclosure, a user may simply slip the handle sleeve 14 over the handle 28 of a cart 26, as shown in FIG. 8. The user may then load equipment 30 into the bag 10 and may, optionally, secure the equipment 30 in the bag 10 using the closing mechanism, such as the strap 18 and buckle 20, wherein the equipment 30 may be stored in an upright position in the bag 10, as shown in FIG. 1.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A storage bag for holding equipment that is not easily stored on a utility cart, the storage bag comprising:

a storage compartment having an opening, the storage compartment configured to accept equipment;

a handle sleeve attached to an outer surface of the bag, the handle sleeve configured to engage with a handle on a utility cart and comprising a handle cutout which allows a user to grasp the handle a barrier positioned on a bottom surface of the storage compartment, wherein the storage bag has dimensions configured not to interfere with the functionality of the utility cart.

2. The storage bag of claim 1, further comprising a closing mechanism positioned proximate to the opening in the storage compartment, the closing mechanism configured to secure the equipment into the storage compartment.

3. The storage bag of claim 2, wherein the closing mechanism comprises:

a strap configured to wrap around a circumference of the bag proximate to the opening; and a cinch buckle attached to the strap.

4. The storage bag of claim 3, wherein the strap comprises a nylon strap.

5. The storage bag of claim 1, further comprising a plurality of side cutouts, wherein the plurality of side cutouts is configured to engage with a shelf.

6. The storage bag of claim 1, wherein the barrier comprises a plastic disk with a lip around an outer circumference thereof.

7. The storage bag of claim 6, wherein the plastic disk is attached to the bottom surface of the storage compartment with a plurality of rivets.

8. The storage bag of claim 1, wherein the storage bag is made of urethane coated 1000 denier ballistic nylon.

9. The storage bag of claim 1, wherein the storage bag is configured to hold the equipment in an upright position.

* * * * *